United States Patent

[11] 3,621,883

| [72] | Inventor | Edwin A. Miller<br>Attleboro, Mass. |
|---|---|---|
| [21] | Appl. No. | 879,072 |
| [22] | Filed | Nov. 24, 1969 |
| [45] | Patented | Nov. 23, 1971 |
| [73] | Assignee | Texas Instruments Incorporated<br>Dallas, Tex. |

[54] TRANSITIONAL CONNECTOR
6 Claims, 3 Drawing Figs.

[52] U.S. Cl. .................................................. 138/143,
29/196.2
[51] Int. Cl. .................................................. F16l 9/02
[50] Field of Search .......................................... 29/196.2,
197.5; 138/141, 142, 143, 177

[56] References Cited
UNITED STATES PATENTS

| 2,311,138 | 2/1943 | Swartz .......................... | 138/143 X |
| 2,406,245 | 8/1946 | Oganowski et al ............. | 29/196.2 |
| 3,168,381 | 2/1965 | Finnegan et al. ............... | 29/197.5 |
| 3,290,129 | 12/1966 | Nock, Jr. et al ................ | 29/197.5 X |

FOREIGN PATENTS

| 631,799 | 11/1961 | Canada ........................ | 29/197.5 |

*Primary Examiner*—Laverne D. Geiger
*Assistant Examiner*—Edward J. Earls
*Attorneys*—Harold Levine, Edward J. Connors, Jr., John A. Haug, James P. McAndrews and Gerald B. Epstein ABSTRACT: An inexpensive transitional connector, suitable for use in joining aluminum tubes to tubes formed of a variety of other materials which cannot be readily soldered, brazed or welded to aluminum, is shown to comprise steel and aluminum tubular elements disposed in coaxial relation to each other, the tubular elements being metallurgically bonded together. Preferably, the transitional connector incorporates a silicon-aluminum layer between the aluminum and steel elements thereof to retard formation of aluminum-iron intermetallic compounds at the interface between the aluminum and steel elements during soldering, brazing or welding of the transitional connector. If desired, the steel element of the connector is clad with a layer of copper.

PATENTED NOV 23 1971 3,621,883
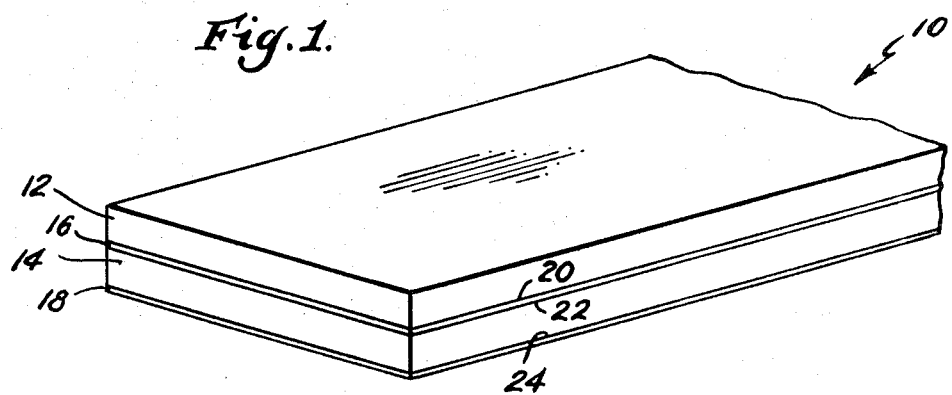
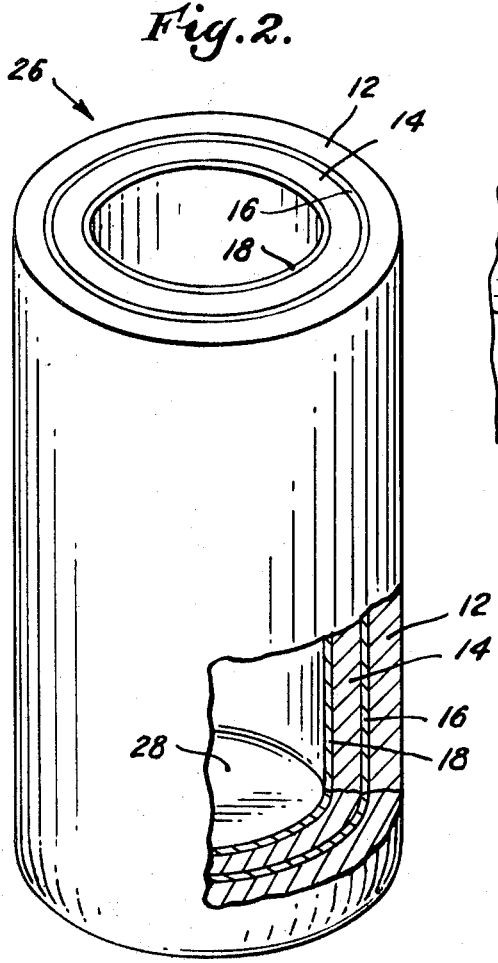
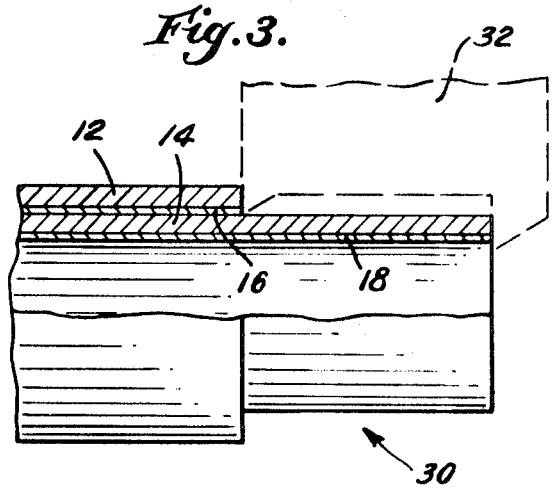
Inventor,
Edwin A. Miller,
by James P. McAndrew
Att'y.

TRANSITIONAL CONNECTOR

In certain refrigeration piping system and the like, aluminum tubes are advantageously used in conjunction with the tubes and tubular elements formed of other materials such as copper and steel. However, it has been found that it is difficult to form solder, braze or other connections between the aluminum tubes and tubes of other materials in the system. For this reason, it has become conventional to use copper-aluminum transitional connectors between the aluminum tubes and copper tubes in such systems, the aluminum element of the connector being readily joined to an aluminum tube by welding and the copper element of the connector being suitable for soldering to copper tubes in the piping system. These transitional connectors are relatively expensive because of their high copper content and, unfortunately, several difficulties have been encountered in using the copper-aluminum connectors. For example, when the connectors are heated during formation of solder joints, reactions occur between the connector materials at relatively low temperatures resulting in the formation of copper-aluminum intermetallic compounds at the interface between the connector layers. As these intermetallics tend to cause delamination of the connector layers, soldering must be very carefully performed to avoid forming weak points in a piping system. Further, it is found that the connectors cannot be used in refrigeration systems transporting ammonia gasses and the like because of reactions occurring between the gasses and the copper materials of the connectors.

It is an object of this invention to provide novel and improved transitional connectors, to provide such connectors which are relatively inexpensive; to provide such connectors which can be readily soldered without tending to form embrittling and delaminating intermetallic compounds between the connector layers; to provide such connectors which are suitable for use in a relatively wider number of piping systems; to provide such connectors which are useful for joining aluminum tubes to a relatively wider number of other tube materials; and to provide such connectors which are easy to manufacture. Other objects, advantages and details of the novel and improved transitional connectors of this invention appear in the following detailed description of preferred embodiments of the invention, the description referring to the drawings in which:

FIG. 1 is a perspective view of a preferred embodiment of the laminate material used in connectors of this invention;

FIG. 2 is a perspective view, to relatively larger scale, of an intermediate product used in forming transitional connectors according to this invention; and FIG. 3 is a section view along the longitudinal axis of the connector of this invention. Referring to the drawing, 10 in FIG. 1 illustrates a novel and improved laminate material useful in forming the improved transitional connectors of this invention. As shown, the laminate material comprises a layer 12 of aluminum material and a layer 14 of steel material, each of these layers forming approximately one-half the thickness of the laminate material 10. Preferably, for example, the laminate layer 12 is formed of inexpensive aluminum material such as commercially pure aluminum which is commonly designated 1,100 Aluminum, SAE 25 Aluminum or AMS 4001 Aluminum and which comprises at least 99 percent aluminum metal. Preferably, also, the steel layer of the laminate is formed of low carbon steel such as the steel sold under SAE and AISI designations as 1006 Steel, which steel alloy has a composition comprising, by weight, approximately 0.08 percent carbon, 0.32 percent manganese, 0.011 percent phosphorous, 0.034 percent sulfur, 0.01 percent silicon, 0.015 percent aluminum, 0.04 percent copper, about 0.39 percent of other elements present as impurities and the balance iron. Where these laminate layer materials are used, an intermediate layer 16 is also preferably used, this intermediate layer embodying a silicon-aluminum alloy or the like. For example, the layer 16 is preferably formed of an alloy having the composition, by weight, of approximately 1.0–1.5 percent silicon, 0.3–0.6 percent iron, 0.001 percent zinc (max.), not more than 0.02 percent of any other element other than aluminum, not more than 0.12 percent total of said other elements and the balance aluminum, which alloy is commercially available under the designation 4022 Aluminum Alloy from Howmet Corporation of Lancaster, Pennsylvania. If desired, the laminate material 10 further includes a layer 18 of copper material such as deoxidized low phosphorous (DLP) copper.

In accordance with this invention, the layers of laminate material 10 are metallurgically bonded together, preferably in the solid-phase, substantially throughout the interfaces 20, 22 and 24 between the laminate layers. For example, the laminate material is preferably formed in accordance with the roll-bonding techniques described in U.S. Pat. Nos. 2,691,815 and 2,753,623 or in other conventional manner such that the interfaces 20, 22 and 24 are firmly bonded together but are substantially free of embrittling intermetallic compounds. Desirably, the laminate materials are annealed in conventional manner after roll-bonding to enhance the drawability of the laminate. In a preferred embodiment of this invention, the laminate material has four layers forming a combined material thickness on the order of 0.080 inches. In this material, the steel layer comprises about 48 percent of the total laminate thickness, the aluminum layers combined comprises about 48 percent of the laminate thickness and the copper layer comprises about 4 percent of the laminate thickness where the combined thickness of the aluminum layers comprises about 48 percent of the total laminate thickness as noted, the layer 16 incorporated in said combined thickness preferably comprises about 4 percent of the total laminate thickness.

In accordance with this invention, the laminate material 10 described with reference to FIG. 1 is subjected to a conventional deep-drawing process to form a cup 26, preferably having the copper layer 18 of the laminate material disposed on the inner surface of the cup. As any known techniques may be used in forming such a cup, the drawing process is not further described herein and it will be understood that the cup material tends to retain its original layer thicknesses during the drawing thereof so that the thickness of the layers of the cup 26 generally correspond to the thicknesses of the layers of the laminate material 10. In accordance with this invention, the cup 26 is then machined in any conventional manner for cutting off the closed end 28 of the cup to form a tubular transitional connector 30 and preferably to remove the aluminum layers from the connector 30 at one end thereof. For example, a cutting tool diagrammatically indicated at 32 in FIG. 3 is preferably used for cutting off the cup end and for simultaneously removing the aluminum layers of the connector 30 while the cup is rotated in a lathe or other conventional apparatus. If desired, the aluminum layers of the connector may be swaged or otherwise formed to provide a flange (not shown) or other similar configuration at a location along the length of the connector 30.

In this way, the novel and improved transitional connector 30 provided by this invention comprises aluminum, steel and copper tubular elements which are arranged in coaxial relation to each other and which are metallurgically bonded together. The connector is thus adapted for use in joining aluminum tubes to tubular elements formed of copper or steel or the like. That is, the end of the connector at which the steel material is exposed is adapted to fit within a steel or copper tube or the like to be readily soldered to the steel or copper tube. Alternately, if desired, the end of the connector at which the steel material is exposed may be flared in any conventional manner to receive a steel or copper tube therein to permit solder joining of the connector to the steel or copper tube. Similarly, the opposite end of the connector is adapted to be inserted into an aluminum tube to permit welding of said connector end to the aluminum tube. The connector 30, in incorporating materials as above described, is particularly adapted to be heated during soldering, brazing or welding of the connector to aluminum, copper or steel tubes or the like without tending to form intermetallic compounds at the laminate interfaces 20, 22 and 24. That is, because the aluminum layers react relatively slowly with the steel layer of the connector at temperatures below about 900° F., it is possible to easily form solder and other connections to the connector without elevating the connector interfaces to temperatures at which undesired aluminum-iron intermetallics could be rapidly formed. It is thus possible to complete the solder or other connections before any substantial intermetallic formation occurs at the connector interfaces 20, 22 and 24.

In alternate embodiments of the connector of this invention, the laminate material 10 can be drawn to dispose the aluminum layer 12 on the cup interior as will be understood. Alternately, the intermediate laminate layer 16 may be omitted from the material used in forming the connector 10. While use of the silicon-aluminum alloy intermediate layer tends to further retard the formation of aluminum-iron intermetallics at the interface between the steel and aluminum layers of the connector during soldering thereof, it is found that adequate solder connections can be made without excessive intermetallic formation where the laminate layers 12 and 14 are metallurgically bonded directly together in the solid phase. In other alternate embodiments of the connector of this invention, the copper layer 18 of the laminate material may be omitted, the steel layer of the laminate as thus exposed being adapted to permit flow of ammonia gasses and the like through the connector without tending to have any undesirable reactions with such gasses. In still other alternate embodiments of the connector of this invention, the layer 18 of the laminate material may be formed of nickel cupronickel, Monel metal or the like metallurgically bonded to the steel layer of the connector to provide the connector with a suitably corrosion-resistant inner surface as desired.

It should be understood that although particular embodiments of the connector of this invention have been described by way of illustration, this invention includes all modifications and equivalents thereof which fall within the scope of the appended claims.

I claim:

1. A transitional connector for use in joining an aluminum tube to a tube of another material comprising a first tube of commercially pure aluminum, a tube of steel and a second tube of aluminum alloy consisting, by weight, of about 1.0 to 1.5 percent silicon, 0.3 to 0.6 percent iron, 0.001 percent zinc (max.), not more than 0.02 percent of any other element other than aluminum, not more than 0.12 percent total of said other elements, and the balance aluminum, said tubes being disposed in coaxial relation to each other with said second tube of aluminum alloy being disposed intermediate said first aluminum tube and said steel tube, said second aluminum tube being metallurgically bonded to said first aluminum tube and to said steel tube.

2. A transitional connector as set forth in claim 1 wherein said steel tube embodies a material consisting, by weight, of about 0.08 percent carbon, 0.32 percent manganese, 0.011 percent phosphorous, 0.034 percent sulfur, 0.01 percent silicon, 0.015 percent aluminum, 0.04 percent copper, about 0.39 percent of other elements present as impurities and the balance iron.

3. A transitional connector as set forth in claim 2 wherein an additional tube of material selected from the group consisting of copper, nickel and cupronickel is disposed in coaxial relation to said steel tube oppositely of said second aluminum tube, said copper tube being metallurgically bonded to said steel tube.

4. A transitional connector as set forth in claim 2 wherein said aluminum tubes are disposed interiorly of said steel tube.

5. A transitional connector as set forth in claim 2 wherein said aluminum tubes are disposed exteriorly of said steel tube.

6. A transitional connector as set forth in claim 5 wherein said steel tube extends outwardly from within said aluminum tubes at one end of said aluminum tubes.

* * * * *